United States Patent
Peng et al.

(10) Patent No.: US 10,921,200 B2
(45) Date of Patent: Feb. 16, 2021

(54) PRESSURE SENSOR, MANUFACTURING METHOD THEREOF, AND ELECTRONIC DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Rui Peng, Beijing (CN); Qinghe Wang, Beijing (CN); Wenbin Jia, Beijing (CN); Zhijie Ye, Beijing (CN); Zhaokang Fan, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 275 days.

(21) Appl. No.: 16/086,137

(22) PCT Filed: Jan. 29, 2018

(86) PCT No.: PCT/CN2018/074416
§ 371 (c)(1),
(2) Date: Sep. 18, 2018

(87) PCT Pub. No.: WO2019/000935
PCT Pub. Date: Jan. 3, 2019

(65) Prior Publication Data
US 2020/0309619 A1    Oct. 1, 2020

(30) Foreign Application Priority Data
Jun. 28, 2017 (CN) .......................... 2017 1 0508581

(51) Int. Cl.
*G01L 1/22*    (2006.01)

(52) U.S. Cl.
CPC .................................. *G01L 1/2287* (2013.01)

(58) Field of Classification Search
CPC ...... G01L 1/2287; G01L 1/241; H01C 10/106
See application file for complete search history.

(56) References Cited

U.S. PATENT DOCUMENTS

| | | | |
|---|---|---|---|
| 6,584,857 B1 * | 7/2003 | Furlani | G01L 1/24 73/800 |
| 9,557,229 B2 | 1/2017 | Dumitru et al. | |

(Continued)

FOREIGN PATENT DOCUMENTS

| | | |
|---|---|---|
| CN | 103063342 A | 4/2013 |
| CN | 104359597 A | 2/2015 |

(Continued)

OTHER PUBLICATIONS

First Office Action for Chinese Patent Application No. 201710508581.3 dated Jan. 23, 2019, 10 pages.

(Continued)

*Primary Examiner* — Kyung S Lee
(74) *Attorney, Agent, or Firm* — Brooks Kushman P.C.

(57) ABSTRACT

A pressure sensor, a method for manufacturing the pressure sensor, and an electronic device are provided. The pressure sensor includes an electroluminescent device and a resistor layer. The resistor layer and one electrode of the electroluminescent device are connected to two electrodes of a power source respectively to form a loop. The pressure sensor is capable of converting a deformation amount caused by a pressure into a brightness change of the electroluminescent device, and determining a size of the pressure in accordance with the brightness change.

20 Claims, 8 Drawing Sheets

(56) References Cited

U.S. PATENT DOCUMENTS

| | | | |
|---|---|---|---|
| 10,180,337 B1* | 1/2019 | Bradbury | G01M 5/0033 |
| 10,521,007 B2* | 12/2019 | Grau | G06F 3/005 |
| 2002/0130312 A1* | 9/2002 | Yu | H01L 27/30 |
| | | | 257/2 |
| 2010/0045705 A1* | 2/2010 | Vertegaal | G06F 3/0482 |
| | | | 345/661 |
| 2010/0108870 A1* | 5/2010 | Kramer | G01L 1/24 |
| | | | 250/231.19 |
| 2012/0086659 A1* | 4/2012 | Perlin | G06F 3/045 |
| | | | 345/173 |
| 2013/0319137 A1 | 12/2013 | Grau et al. | |
| 2015/0082897 A1 | 3/2015 | Kim et al. | |
| 2015/0378514 A1* | 12/2015 | Keski-Jaskari | G01L 1/16 |
| | | | 345/178 |
| 2018/0106689 A1 | 4/2018 | Tian | |
| 2018/0308905 A1* | 10/2018 | Jia | H01L 51/504 |

FOREIGN PATENT DOCUMENTS

| | | |
|---|---|---|
| CN | 104868778 A | 8/2015 |
| CN | 105136375 A | 12/2015 |
| CN | 105651429 A | 6/2016 |
| CN | 105675178 A | 6/2016 |
| CN | 105987781 A | 10/2016 |
| CN | 106153223 A | 11/2016 |
| CN | 106370327 A | 2/2017 |
| CN | 106768520 A | 5/2017 |
| CN | 107290084 A | 10/2017 |

OTHER PUBLICATIONS

Written Opinion of the International Searching Authority for International Application No. PCT/CN2018/074416, dated May 7, 2018.

* cited by examiner

PRESSURE SENSOR, MANUFACTURING METHOD THEREOF, AND ELECTRONIC DEVICE

CROSS-REFERENCE TO RELATED APPLICATIONS

This application is the U.S. national phase of PCT Application No. PCT/CN2018/074416 filed on Jan. 29, 2018, which claims priority to Chinese Patent Application No. 201710508581.3 filed on Jun. 28, 2017, which are incorporated herein by reference in their entireties.

TECHNICAL FIELD

The present disclosure relates to the field of pressure detection technology, in particular to a pressure sensor, a manufacturing method thereof, and an electronic device.

BACKGROUND

As the most commonly-used sensor in the industry, a pressure sensor has been widely in various automatic control scenarios. Most of the pressure sensors in the related art are mechanical sensors, e.g., piezoresistive pressure sensors and capacitive pressure sensors, which are capable of converting a pressure signal into an electric signal, so as to detect a size of a pressure.

SUMMARY

In one aspect, the present disclosure provides in some embodiments a pressure sensor, including: an electroluminescent device, comprising a first electrode, a second electrode and an electroluminescent layer arranged between the first electrode and the second electrode; a resistor layer configured to be deformed in a such manner as to change a resistance of the resistor layer when a pressure is applied to the resistor layer. The first electrode and the resistor layer are connected to two electrodes of a power source respectively to form a loop; at least one photoelectric sensor configured to acquire a parameter related to a brightness change of the electroluminescent device; and a detection unit connected to the photoelectric sensor and configured to determine a size of the pressure in accordance with the parameter related to the brightness change of the electroluminescent device.

In a possible embodiment of the present disclosure, the pressure sensor further includes an elastic restoration layer arranged in contact with the resistor layer, made of an elastic material, and configured to be restored from deformation when the pressure is removed so as to restore the resistor layer to its initial state.

In a possible embodiment of the present disclosure, the pressure sensor further includes a support layer. The resistor layer includes a first conductive structure arranged on the elastic restoration layer and a second conductive structure arranged on the support layer. The first conductive structure and the second conductive structure are arranged between the support layer and the elastic restoration layer. When the resistor layer is deformed due to the pressure, a contact area between the first conductive structure and the second conductive structure changes, to change the resistance of the resistor layer.

In a possible embodiment of the present disclosure, in the above pressure sensor, the first conductive structure includes a plurality of first protrusions, and the second conductive structure includes a plurality of second protrusions. Each first protrusion is arranged at a position corresponding to a region between respective two adjacent second protrusions, and each second protrusion is arranged at a position corresponding to a region between respective two adjacent first protrusions. When the resistor layer is deformed due to the pressure, a contact area between each first protrusion and the corresponding second protrusion increases, so as to reduce the resistance of the resistor layer.

In a possible embodiment of the present disclosure, in the above pressure sensor, the support layer is formed integrally with the second electrode.

In a possible embodiment of the present disclosure, in the above pressure sensor, the second electrode is made of an electrically conductive polymer.

In a possible embodiment of the present disclosure, the first protrusions and the second protrusions are each a metallic nanorod or a carbon nanotube.

In a possible embodiment of the present disclosure, in the above pressure sensor, the resistor layer further includes: a first semiconductive film covering the elastic restoration layer between the first protrusions; and a second semiconductive film covering the second electrode between the second protrusions.

In a possible embodiment of the present disclosure, in the above pressure sensor, the first semiconductive film and the second semiconductive film are each made of graphene.

In a possible embodiment of the present disclosure, in the above pressure sensor, the photoelectric sensor is arranged at a surface of the first electrode distal to the electroluminescent layer.

In a possible embodiment of the present disclosure, the pressure sensor further includes a flexible substrate on which the elastic restoration layer is arranged, and the resistor layer is arranged at a surface of the elastic restoration layer distal to the flexible substrate.

In another aspect, the present disclosure provides in some embodiments a method for manufacturing the above pressure sensor, including: forming the electroluminescent device, including forming the first electrode, the second electrode and the electroluminescent layer between the first electrode and the second electrode; forming the resistor layer, the first electrode and the resistor layer being connected to two electrodes of a power source respectively so as to form a loop; forming the photoelectric sensor, the photoelectric sensor being configured to acquire a parameter related to a brightness change of the electroluminescent device; and providing the detection unit, the detection unit being connected to the photoelectric sensor and configured to determine a size of the pressure in accordance with the parameter related to the brightness change of the electroluminescent device.

In a possible embodiment of the present disclosure, the method further includes forming an elastic restoration layer made of an elastic material and arranged in contact with the resistor layer. The elastic restoration layer is restored from deformation when the pressure is removed, so as to restore the resistor layer to its initial state.

In a possible embodiment of the present disclosure, the method further includes providing a support layer. The forming the resistor layer includes: forming a first conductive structure on the elastic restoration layer; and forming a second conductive layer on the support layer. The first conductive structure and the second conductive structure are arranged between the support layer and the elastic restoration layer. When the resistor layer is deformed due to the pressure, a contact area between the first conductive structure and the second conductive structure changes, so as to change the resistance of the resistor layer.

In a possible embodiment of the present disclosure, in the above method, the forming the first conductive structure includes forming a plurality of first protrusions, and the forming the second conductive structure includes forming a plurality of second protrusions. Each first protrusion is arranged at a position corresponding to a region between respective two adjacent second protrusions, and each second protrusion is arranged at a position corresponding to a region between respective two adjacent first protrusions. When the resistor layer is deformed due to the pressure, a contact area between each first protrusion and the corresponding second protrusion increases, so as to reduce the resistance of the resistor layer.

In a possible embodiment of the present disclosure, in the above method, the forming the second conductive structure on the support layer includes forming the second conductive structure on the second electrode, and the support layer is formed integrally with the second electrode.

In a possible embodiment of the present disclosure, the method further includes: forming a plurality of first grooves in a first transitional substrate; filling a conductive material into the first grooves so as to form the first protrusions; applying the elastic material onto a surface of the first transitional substrate with the first protrusions, so as to form the elastic restoration layer; forming a flexible substrate on a surface of the elastic restoration layer distal to the first transitional substrate; removing the first transitional substrate, so as to form a first substrate comprising the flexible substrate, the elastic restoration layer on the flexible substrate and the first protrusions on the elastic restoration layer; forming a plurality of second grooves in a second transitional substrate; filling a conductive material into the second grooves so as to form the second protrusions; forming the second electrode on a surface of the second transitional substrate with the second protrusions; pressuring and coating the second electrode with a third transitional substrate; removing the second transitional substrate, so as to form a second substrate comprising the third transitional substrate, the second electrode on the third transitional substrate, and the second protrusions on the second electrode; and aligning and fixing the first substrate and the second substrate to form a cell, and removing the third transitional substrate.

In a possible embodiment of the present disclosure, prior to aligning and fixing the first substrate and the second substrate to form the cell, the method further includes forming a first semiconductive film covering the elastic restoration layer between adjacent first protrusions, and forming a second semiconductive film covering the second electrode between adjacent second protrusions.

In a possible embodiment of the present disclosure, the first grooves and the second grooves each has a nanoscale diameter.

In yet another aspect, the present disclosure provides in some embodiments an electronic device including the above-mentioned pressure sensor.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Due to such advantages as self-luminescence, high luminous efficiency, low operating voltage, being thin and light, being flexible and simple manufacture process, electroluminescent devices have been widely used in the field of display and lighting. Based on the features of the electroluminescent device, an object of the present disclosure is to provide a novel pressure sensor that combines the electroluminescent device and the sensor and is capable of converting a pressure signal into an optical signal, so as to determine a size of a pressure in accordance with the optical signal.

The present disclosure provides in some embodiments a pressure sensor, including: an electroluminescent device, including a first electrode, a second electrode and an electroluminescent layer arranged between the first electrode and the second electrode; a resistor layer configured to be deformed in a such manner as to change a resistance of the resistor layer when a pressure is applied thereto, the first electrode and the resistor layer being connected to two electrodes of a power source respectively so as to form a loop; at least one photoelectric sensor configured to acquire a parameter related to a brightness change of the electroluminescent device; and a detection unit connected to the photoelectric sensor and configured to determine a size of the pressure in accordance with the parameter related to the brightness change of the electroluminescent device.

An operating principle of the pressure sensor will be described hereinafter. When the pressure is applied to the pressure sensor, the resistor layer may be deformed due to the pressure, and its resistance may change accordingly. At this time, a current flowing through a power supply loop of the electroluminescent device may change, thereby a brightness value of a light beam from the electroluminescent device may change too. A brightness change is associated with the size of the pressure, so it is able to determine the size of the pressure through detecting the brightness change of the electroluminescent device. The size of the pressure applied to the pressure sensor is in direct proportion to a deformation amount of the resistor layer, i.e., the larger the pressure applied to the pressure sensor, the larger the deformation amount of the resistor layer.

In the embodiments of the present disclosure, the pressure sensor is capable of converting a pressure signal into an optical signal and determining the size of the pressure by detecting the change in the optical signal, i.e., a novel method for detecting the size of the pressure is provided.

The pressure sensor may be applied to an electronic device, so as to detect the size of the pressure, thereby to achieve automatic control on the basis of the pressure. To be specific, the pressure sensor may be applied to various automatic control scenarios, e.g., water resources and hydropower, railway traffic, smart buildings, automatically-controlled manufacture, aerospace, military industry, petrochemical industry, oil well, electric power industry, shipping industry, machine tools, and pipelines.

Further, when the electroluminescent device is a flexible organic light-emitting diode (OLED), the pressure sensor may also be applied to electronic skin.

The present disclosure will be described hereinafter in more details in conjunction with the drawings and embodiments. The following embodiments are for illustrative purposes only, but shall not be used to limit the scope of the present disclosure.

Figure 1:
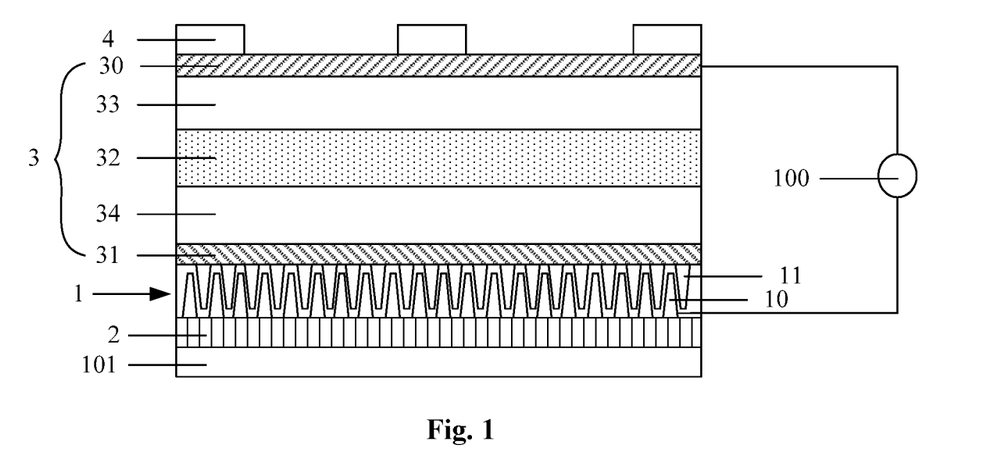
FIG. 1 is a schematic view showing a pressure sensor according to one embodiment of the present disclosure.
Figure 2:
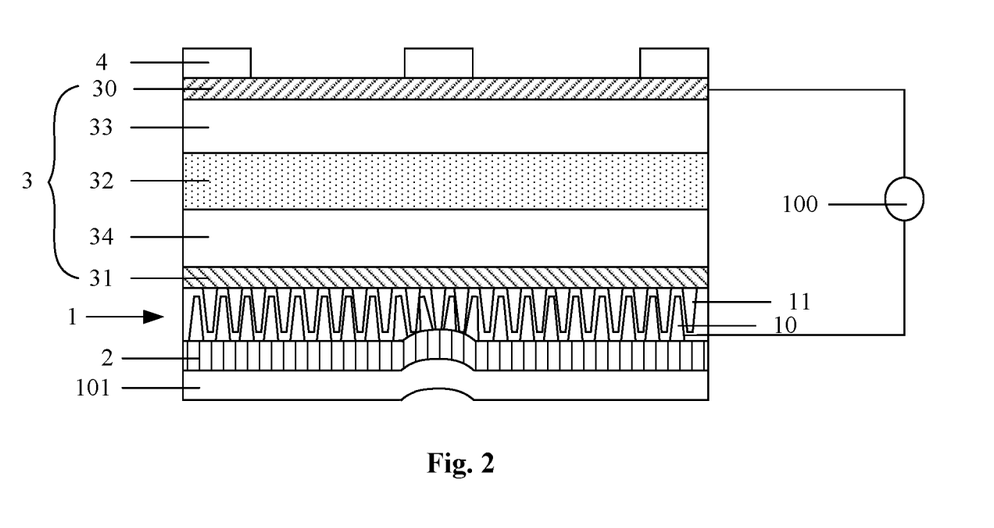
FIG. 2 is a schematic view showing an operating state of the pressure sensor in FIG. 1.

As shown in FIGS. 1 and 2, the electroluminescent device of the pressure sensor is an OLED, so as to provide a flexible pressure sensor. The pressure sensor includes the OLED 3, a resistor layer 1, at least one photoelectric sensor 4, and a detection unit. The OLED 3 includes a first electrode 30, a second electrode 31 and an organic light-emitting layer 32 arranged between the first electrode 30 and the second electrode 31. The first electrode 30 and the second electrode 31 may each be made of metal, e.g., copper (Cu), aluminium (Al), silver (Ag), molybdenum (Mo), chromium (Cr), neodymium (Nd), nickel (Ni), manganese (Mn), titanium (Ti), tantalum (Ta) or tungsten (W), or an alloy thereof. The first electrode 30 and the second electrode 31 may each be of a single-layered structure, or a multi-layered structure such as Cu/Mo, Ti/Cu/Ti or Mo/Al/Mo. In addition, the first electrode 30 and the second electrode 31 may also be made of an electrically conductive polymer. The organic light-emitting layer 32 may be made of a fluorescent material or a phosphorescent material. The first electrode 30 and the resistor layer 1 may be connected to two electrodes of a power source 100 respectively so as to form a loop. When a pressure is applied onto the pressure sensor, the resistor layer 1 may be deformed due to the pressure, and its resistance may change. At this time, a current flowing through the OLED 3 may change, thereby a brightness value of a light beam from the OLED 3 may change too. The at least one photoelectric sensor 4 is configured to acquire a parameter related to a brightness change of the OLED 3. The detection unit is connected to the photoelectric sensor 4 and configured to determine the size of the pressure applied to the pressure sensor in accordance with the parameter related to the brightness change of the OLED 3.

Through the pressure sensor with the above-mentioned structure, it is able to convert the deformation caused by the pressure into the brightness change of the OLED, thereby to determine the size of the pressure in accordance with the brightness change. Hence, the pressure sensor in the embodiments of the present disclosure has such advantages as low driving voltage, high efficiency, simple structure and simple manufacture process. In addition, the OLED is flexible, so it is able to provide a flexible pressure sensor, thereby to enable the pressure sensor to be applied to electronic skin.

In order to detect the pressure recurrently, the pressure sensor may further include an elastic restoration layer 2 made of an elastic material and arranged in contact with the resistor layer 1. When the pressure is applied to pressure sensor, the elastic restoration layer 2 may be deformed too, as shown in FIG. 2. When the pressure applied to the pressure sensor is removed, the elastic restoration layer 2 may be restored from deformation, so as to restore the resistor layer 1 to its initial state, as shown in FIG. 1.

Usually, the initial state of the resistor layer 1 is a natural state where the resistor layer 1 is not deform when no external force is applied. The OLED 3 may further include any other functional layers, such as an electron transport layer 33 and a hole transport layer 34.

Figure 3:
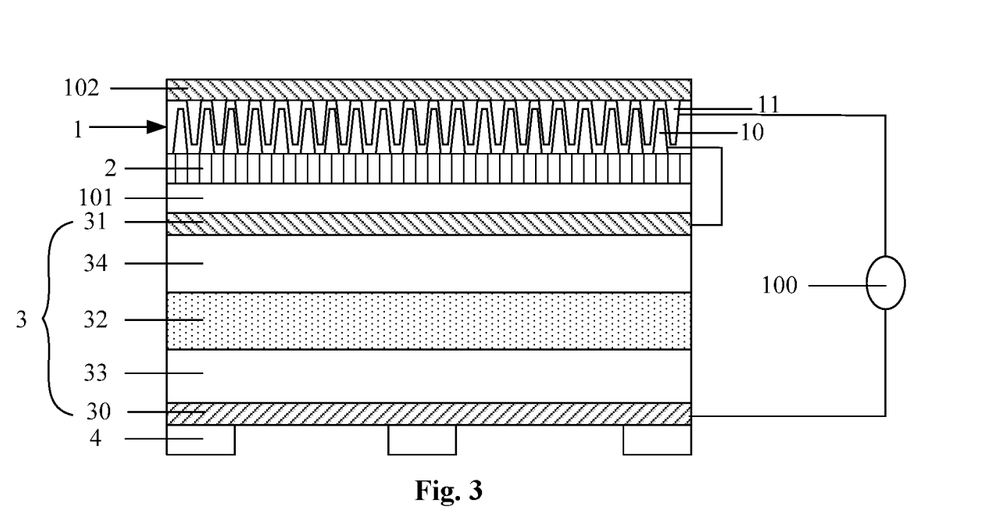
FIG. 3 is a schematic view showing another pressure sensor according to one embodiment of the present disclosure.

To be specific, the pressure may be applied to the pressure sensor at a side of the elastic restoration layer 2 distal to the resistor layer 1, as shown in FIG. 2, or at a side of the resistor layer 1 distal to the elastic restoration layer, as shown in FIG. 3. Further, the pressure is applied to the pressure sensor through a surface of the elastic restoration layer 2 distal to the resistor layer 1, or a surface of the resistor layer 1 distal to the elastic restoration layer 2, so as to improve the pressure detection sensitivity, and enable to detect a tiny pressure applied to the pressure sensor.

In order to improve the integration level, the photoelectric sensor 4 may be arranged at a surface of the first electrode 30 distal to the organic light-emitting layer 32, i.e., the photoelectric sensor 4 may be integrated with the OLED 3. Of course, the photoelectric sensor may also be arranged independently. The photoelectric sensor 4 may be, but not limited to, a photodiode which is a semiconductive element consisting of two electrodes and a PN junction between the two electrodes. The photodiode is unilaterally conductive and capable of converting an optical signal into an electric signal. When the photoelectric sensor 4 is arranged on the first electrode 30 of the OLED 3, the first electrode 30 of the OLED 3 may further sever as an electrode of the photoelectric sensor 4.

In a possible embodiment of the present disclosure, the pressure sensor further includes a flexible substrate 101 on which the elastic restoration layer 2 and the resistor layer 1 are arranged, so as to facilitate the formation of the elastic restoration layer 2 and the resistor layer 1. In addition, through the flexible substrate, it is able to provide the flexible pressure sensor. The flexible substrate 101 may be a plastic substrate, a metal foil or an ultrathin glass substrate. The resistor layer 1 may be arranged at a surface of the elastic restoration layer 2 distal to the flexible substrate 101, as shown in FIGS. 1 and 3. Alternatively, the resistor layer may also be arranged between the flexible substrate and the elastic restoration layer, as long as the elastic restoration layer is in contact with the resistor layer so as to restore the resistor layer to its initial state when the elastic restoration layer is restored from the deformation.

The OLED may further be arranged on the flexible substrate, so as to further improve the integration level and provide the flexible pressure sensor. In order to facilitate the pressure detection, the pressure sensor may be of either of the following two structures.

For a first structure, as shown in FIG. 1, the resistor layer 1 and the elastic restoration layer 2 are arranged sequentially on the flexible substrate 101, and the second electrode 31, the organic light-emitting layer 32 and the first electrode 30 of the OLED 3 are arranged sequentially on the surface of the resistor layer 1 distal to the elastic restoration layer 2. The first electrode 30 and the resistor layer 1 are connected to the two electrodes of the power source 100 respectively, so as to form a loop. When the pressure is applied to the pressure sensor from a surface of the flexible substrate 101 distal to the elastic restoration layer 1, the elastic restoration layer 2 and the resistor layer 1 may be deformed, so as to change the resistance of the resistor layer 1 and change the current flowing through the OLED 3, thereby to change the brightness of the OLED 3.

For a second structure, as shown in FIG. 3, the resistor layer 1 and the elastic restoration layer 2 are arranged on the surface of the flexible substrate 101, and the second electrode 31, the organic light-emitting layer 32 and the first electrode 30 of the OLED 3 are arranged sequentially at a back surface of the flexible substrate 101 opposite to the surface. The resistor layer 1 may be connected to the second electrode 31 of the OLED 2, and the resistor layer 1 and the first electrode 30 are connected to the two electrodes of the power source 100 respectively, so as to form a loop. When the pressure is applied to the pressure sensor from the surface of the flexible substrate 101, the elastic restoration layer 2 and the resistor layer 1 may be deformed, so as to change the resistance of the resistor layer 1 and change the current flowing through the OLED 3, thereby to change the brightness of the OLED 3. The elastic restoration layer 2 may be arranged between the flexible substrate 101 and the resistor layer 1, or arranged at a surface of the resistor layer distal to the flexible substrate.

In a possible embodiment of the present disclosure, the resistor layer 1, the elastic restoration layer 2 and the OLED 3 are arranged on a common flexible substrate. The structure thereof has been described hereinabove, and thus will not be particularly defined herein. The photoelectric sensor 4 is arranged at a light-exiting side of the OLED 3. For example, when a light beam from the OLED 3 passes through the first electrode 30, the photoelectric sensor 4 may be arranged at a surface of the first electrode 30 distal to the organic light-emitting layer 32.

Through the above description, it is able to improve the integration level of the pressure sensor and simplify the structure of the pressure sensor. In addition, it is able to provide the flexible pressure sensor, thereby to meet the requirement of an electronic device, e.g., electronic skin.

According to the pressure sensor in the embodiments of the present disclosure, the resistor layer is added in the power supply loop of the OLED. When the resistor layer is deformed due to the pressure applied to the pressure sensor, the resistance of the resistor layer may change, and thereby the current flowing through the power supply loop may change too. As a result, it is able to convert the pressure signal into the optical signal of the OLED, thereby to detect the size of the pressure.

In a possible embodiment of the present disclosure, as shown in FIG. 3, the pressure sensor further includes a support layer 102 configured to support thereon the resistor layer 1. The resistor layer 1 having the above function includes: a first conductive structure arranged on the elastic restoration layer 2 and a second conductive structure arranged on the support layer 102. The first conductive structure and the second conductive structure are arranged between the support layer 102 and the elastic restoration layer 2. When the resistor layer 1 is deformed due to the pressure, a contact area between the first conductive structure and the second conductive structure changes, so as to change the resistance of the resistor layer 1.

The resistor layer is arranged between the support layer and the elastic restoration layer, and the resistor layer includes the two conductive structures arranged opposite to each other. When the contact area between the two conductive structures change due to the pressure, the resistance of the resistor layer may change too.

To be specific, the first conductive structure may include a plurality of first protrusions 10 arranged in an upper surface of the elastic restoration layer 2 as shown in FIGS. 1-3, and the second conductive structure may include a plurality of second protrusions 11 arranged in a lower surface of the second electrode 31 as shown in FIGS. 1-2 or in a lower surface of the support layer 102 as shown in FIG. 3. The upper surface of the elastic restoration layer 2 is arranged opposite to the lower surface of the second electrode 31 or the support layer 102, and the first protrusions 10 and the second protrusions 11 are arranged in a staggered manner. An orthogonal projection of each first protrusion 10 onto the flexible substrate 101 is separated from or incompletely overlaps an orthogonal projection of each second protrusion 11 adjacent to the first protrusion 10 onto the flexible substrate 101, and vice versa. Hence, each first protrusion 10 is arranged at a position corresponding to a region between respective two adjacent second protrusions 11, and each second protrusion 11 is arranged at a position corresponding to a region between respective two adjacent first protrusions 10. When the pressure is applied to the pressure sensor, the resistor layer 1 may be deformed, so as to increase a contact area between the first protrusion 10 and the corresponding second protrusion 11, thereby to reduce the resistance of the resistor layer 1. In a possible embodiment of the present disclosure, when an appropriate pressure is applied to the pressure sensor, the first protrusion 10, whose position changes due to the pressure, is capable of filling up the spacer between two adjacent second protrusions 11, so as to maximize the contact area between the first protrusion 10 and the two second protrusions 11.

It should be appreciated that, although each of the first protrusions 10 and the second protrusions 11 in the drawings is of a trapezoidal shape, the first protrusions 10 and the second protrusions 11 are not limited thereto. To be specific, the first protrusions 10 and the second protrusions 11 may each be of a rectangular shape, a cuboidal shape, a cylindrical shape or the like, as long as the contact area between the first protrusion 10 and the corresponding second protrusion 11 increases when the pressure is applied to the pressure sensor. Each first protrusion 10 may be of a shape and a size different from or same as the second protrusion 11. In addition, the first protrusions 10 may be of different shapes and sizes, or a same shape and a same size, and the second protrusions 11 may be of different shapes and sizes, or a same shape and a same size.

The resistor layer is arranged between the support layer and the elastic restoration layer, and the resistor layer includes two conductive structures arranged opposite to each other. Each conductive structure is of an uneven surface. When the pressure is applied to the pressure sensor, the resistor layer may be deformed and the contact area between the two conductive structures may increase, so the resistance of the resistor layer may be reduced.

It should be appreciated that, when the first protrusions are directly arranged on the elastic restoration layer and the second protrusions are directly arranged on the support layer, a distance between the elastic restoration layer and the support layer shall be smaller than a height of each of the first protrusions and the second protrusions in the case that no pressure is applied to the pressure sensor. At this time, when the resistor layer is deformed, the contact area between the first protrusion and the corresponding second protrusion may change in accordance with the size of the pressure, and thereby it is able to detect the size of the pressure. The height of the first protrusion or the second protrusion refers to an extension of the first protrusion or the second protrusion in a direction perpendicular to a plane where the elastic restoration layer is located.

It should be appreciated that, the structure of the resistor layer is not limited thereto, as long as the resistance of the resistor layer is capable of being changed due to the deformation thereof.

In a possible embodiment of the present disclosure, as shown in FIG. 1, the support layer may be formed integrally with the second electrode 31 of the OLED, i.e., the resistor layer 1 may be arranged between the elastic restoration layer 2 and the second electrode 31, and the organic light-emitting layer 32 and the first electrode 30 of the OLED 3 may be arranged sequentially at a side of the second electrode 31 distal to the elastic restoration layer 2. In this way, it is unnecessary to form the support layer through a separate process, thereby to reduce the manufacture cost. In addition, it is able to improve the integration level, and simplify the structure of the pressure sensor.

In a possible embodiment of the present disclosure, the OLED 3, the resistor layer 1 and the elastic restoration layer 2 may be arranged sequentially on the surface of the flexible substrate 101, and thus the flexible substrate 101 may support the OLED 3, the resistor layer 1 and the elastic restoration layer 2, so as to facilitate the manufacture of the pressure sensor and provide the flexible pressure sensor.

In order to further improve the integration level, the photoelectric sensor 4 is arranged at a surface of the first electrode 30 distal to the organic light-emitting layer 32, and the light beam from the OLED 3 passes through the first electrode 30. Alternatively, the photoelectric sensor may also be arranged at the back surface of flexible substrate distal to the elastic restoration layer, and at this time, the light beam from the OLED may pass through the second electrode and the back surface of the flexible substrate. As mentioned above, the resistor layer, the OLED and the photoelectric sensor are formed integrally, so as to improve the integration level and further simplify the structure of the pressure sensor. A material of each of the first electrode 30 and the second electrode 31 may be selected in accordance with a position of the light-exiting side of the OLED. For example, when the light beam from the OLED passes through the first electrode, the second electrode may be made of a material capable of reflecting the light beam, e.g., Ag, and the first electrode may be made of a transparent conductive material having high light transmittance, e.g., indium tin oxide (ITO) or intrinsic zinc oxide (I—ZnO).

In a possible embodiment of the present disclosure, each of the first protrusions 10 and the second protrusions 11 of the resistor layer 1 may be made of a metallic nanorod or a carbon nanotube, so as to facilitate the formation of tiny protrusions. In this way, in the case of a same deformation amount of the resistor layer, it is able to increase a variation amount of the contact area between the first protrusion and the second protrusion, thereby to improve the detection sensitivity.

Figure 16:
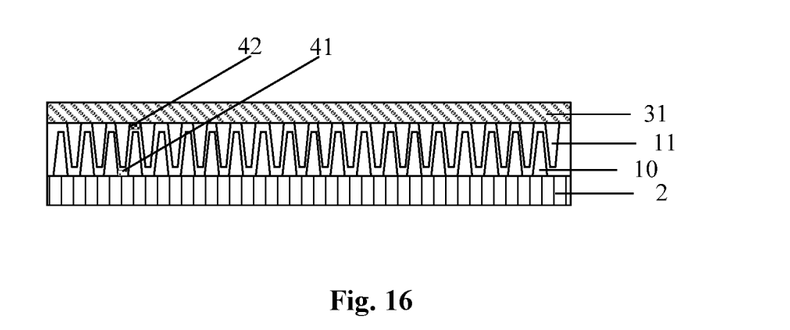
FIG. 16 is a schematic view showing a resistor layer including a first semiconductive film and a second semiconductive film according to one embodiment of the present disclosure.

As shown in FIG. 16, the resistor layer 1 in FIGS. 1 and 2 may further include a first semiconductive film 41 covering a portion of the elastic restoration layer 2 between the adjacent first protrusions 10, and a second semiconductive film 42 covering a portion of the second electrode 31 between the adjacent second protrusions 11.

It should be appreciated that, for clarification, the first semiconductive film 42 and the second semiconductive film 42 are not shown in FIGS. 1 and 2. In addition, although merely one first semiconductive film 41 and one second semiconductive film 42 are illustratively shown in FIG. 16, a respective one first semiconductive film 41 may be arranged on each portion of the elastic restoration layer 2 between every two adjacent first protrusions 10 of the resistor layer, and a respective one second semiconductive film 42 may be arranged on each portion of the second electrode 31 between every two adjacent second protrusions 11 of the resistor layer. Similarly, although not shown in FIG. 3, a respective one first semiconductive film may be arranged on each portion of the elastic restoration layer 2 between every two adjacent first protrusions 10 of the resistor layer 1, and a respective one second semiconductive film may be arranged on each portion of the support layer 102 between every two adjacent second protrusions 11 of the resistor layer.

The first protrusions of the resistor layer may be electrically connected to each other through the first semiconductive film, and the second protrusions may be electrically connected to each other through the second semiconductive film, so the first protrusions and the second protrusions may be connected to the power source or any other electrical structure via the first semiconductive film and the second semiconductive film respectively.

The first semiconductive film and the second semiconductive film may each be made of graphene. Alternatively, the first semiconductive film and the second semiconductive film may be made of different semiconductive materials, so as to form a PN junction and allow the current to flow unilaterally, thereby to protect the pressure sensor.

The present disclosure further provides in some embodiments an electronic device including the above-mentioned pressure sensor, so as to detect the size the pressure, thereby to achieve the automatic control on the basis of the pressure.

Figure 15:
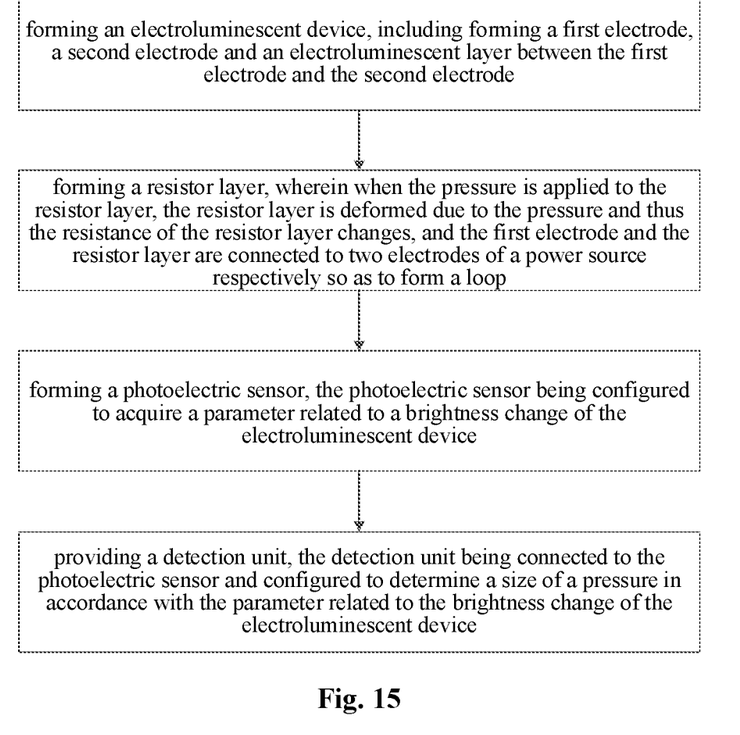
FIG. 15 is a flow chart of a method for manufacturing the pressure sensor according to one embodiment of the present disclosure.

Based on a same inventive concept, the present disclosure further provides in some embodiments a method for manufacturing the pressure sensor which, as shown in FIG. 15, includes: forming the electroluminescent device, including forming the first electrode, the second electrode and the electroluminescent layer between the first electrode and the second electrode; forming the resistor layer, wherein when the pressure is applied to the resistor layer, the resistor layer is deformed due to the pressure and thus the resistance of the resistor layer changes, and the first electrode and the resistor layer are connected to two electrodes of a power source respectively so as to form a loop; forming the photoelectric sensor, the photoelectric sensor being configured to acquire a parameter related to a brightness change of the electroluminescent device; and providing the detection unit, the detection unit being connected to the photoelectric sensor and configured to determine a size of a pressure in accordance with the parameter related to the brightness change of the electroluminescent device.

According to the method in the embodiments of the present disclosure, it is able for the resultant pressure sensor to convert the deformation caused by the pressure into the brightness change of the OLED, thereby to determine the size of the pressure in accordance with the brightness change. Hence, the pressure sensor in the embodiments of the present disclosure has such advantages as low driving voltage, high efficiency, simple structure and simple manufacture process. In addition, the OLED is flexible, so it is able to provide the flexible pressure sensor, thereby to enable the pressure sensor to meet the requirements of an electronic device, e.g., electronic skin.

In a possible embodiment of the present disclosure, the method further includes forming an elastic restoration layer made of an elastic material and arranged in contact with the resistor layer. The elastic restoration layer is restored from deformation when the pressure applied thereto is removed, so as to restore the resistor layer to its initial state.

Through the elastic restoration layer in contact with the resistor layer, when pressure applied to the resistor layer is removed, the resistor layer may be restored to its initial state, so as to detect the pressure recurrently.

In order to facilitate the manufacture, the method further includes providing a support layer. The forming the resistor layer includes: forming a first conductive structure on the elastic restoration layer; and forming a second conductive layer on the support layer. The first conductive structure and the second conductive structure are arranged between the support layer and the elastic restoration layer. When the resistor layer is deformed due to the pressure, a contact area between the first conductive structure and the second conductive structure changes, so as to change the resistance of the resistor layer.

As mentioned above, the resistor layer is arranged between the support layer and the elastic restoration layer and includes the two conductive structures arranged opposite to each other. The contact area between the two conductive structures changes due to the pressure, so the resistance of the resistor layer may change too.

In a possible embodiment of the present disclosure, the forming the first conductive structure includes forming a plurality of first protrusions, and the forming the second conductive structure includes forming a plurality of second protrusions. Each first protrusion is arranged at a position corresponding to a region between two adjacent second protrusions, and each second protrusion is arranged at a position corresponding to a region between two adjacent first protrusions. When the resistor layer is deformed due to the pressure, a contact area between the first protrusion and the corresponding second protrusion increases, so as to reduce the resistance of the resistor layer.

The resistor layer is arranged between the support layer and the elastic restoration layer, and it includes two conductive structures arranged opposite to each other. Each conductive structure is of an uneven surface. When the pressure is applied to the pressure sensor, the resistor layer may be deformed and the contact area between the two conductive structures may increase, so the resistance of the resistor layer may be reduced.

In a possible embodiment of the present disclosure, the support layer and the second electrode of the OLED are formed integrally, and specifically the second conductive structure is formed on the second electrode. In other words, the resistor layer may be arranged between the elastic restoration layer and the second electrode, and the organic light-emitting layer and the first electrode of the OLED may be arranged sequentially at a side of the second electrode distal to the elastic restoration layer. In this way, it is unnecessary to form the support layer through a separate process, thereby to reduce the manufacture cost. In addition, it is able to improve the integration level, and simplify the structure of the pressure sensor.

To be specific, the method for manufacturing the pressure sensor includes: forming a plurality of first grooves each having a nanoscale diameter in a first transitional substrate; filling a conductive material into the first grooves so as to form the first protrusions; applying the elastic material onto a surface of the first transitional substrate with the first protrusions, so as to form the elastic restoration layer; forming a flexible substrate on a surface of the elastic restoration layer distal to the first transitional substrate; removing the first transitional substrate, so as to form a first substrate including the flexible substrate, the elastic restoration layer on the flexible substrate and the first protrusions on the elastic restoration layer; forming a plurality of second grooves each having a nanoscale diameter in a second transitional substrate; filling a conductive material into the second grooves so as to form the second protrusions; forming the second electrode on a surface of the second transitional substrate with the second protrusions; coating the second electrode with a third transitional substrate; removing the second transitional substrate, so as to form a second substrate comprising the third transitional substrate, the second electrode on the third transitional substrate, and the second protrusions on the second electrode; and aligning and fixing the first substrate and the second substrate to form a cell, and removing the third transitional substrate.

For the pressure sensor manufactured as mentioned above, the elastic restoration layer, the resistor layer and the OLED are arranged sequentially on a surface of the flexible substrate, so it is able to provide a flexible pressure sensor and improve the integration level thereof. The organic light-emitting layer and the first electrode of the OLED are arranged sequentially at a surface of the second electrode distal to the elastic restoration layer. In a possible embodiment of the present disclosure, prior to aligning and fixing the first substrate and the second substrate to form the cell, the method further includes forming a first semiconductive film covering the elastic restoration layer between the first conductive structures, and forming a second semiconductive film covering the second electrode between the second conductive structures.

The first protrusions of the resistor layer may be electrically connected to each other through the first semiconductive film, and the second protrusions may be electrically connected to each other through the second semiconductive film, so the first protrusions and the second protrusions may be connected to the power source or any other electrical structure via the first semiconductive film and the second semiconductive film respectively.

In a possible embodiment of the present disclosure, the photoelectric sensor may also be formed on a surface of the first electrode of the OLED distal to the organic light-emitting layer, and the light beam from the OLED may pass through the first electrode. Of course, the photoelectric sensor may also be formed on a back surface of the flexible substrate distal to the elastic restoration layer, and at this time, the light beam from the OLED may pass through the second electrode and exit from the back surface of the flexible substrate. As a result, the resistor layer, the OLED and the photoelectric sensor are formed integrally, it is able to further simplify the structure of the pressure sensor.

In a possible embodiment of the present disclosure, the method for manufacturing the pressure sensor may include the following steps.

Step S1: as shown in FIG. 1, a plurality of first grooves is formed in the first transitional substrate 103. Each first groove has a depth of 1 μm and a diameter of 50 nm.

The first transitional substrate may be a silicon substrate, and each first groove may be formed through etching, e.g., photoetching. To be specific, a photoresist may be applied onto a surface of the first transitional substrate, and then exposed and developed so as to form a photoresist reserved region and a photoresist unreserved region corresponding to a region where the first grooves are located. Next, the first transitional substrate may be immersed into a silane solution of 0.03 mol/L for 1 h in an N2 atmosphere. Finally, the remaining photoresist may be removed, and the first transitional substrate may be baked at a temperature of 110° C. to 120° C. for 20 to 30 min.

Figure 4:
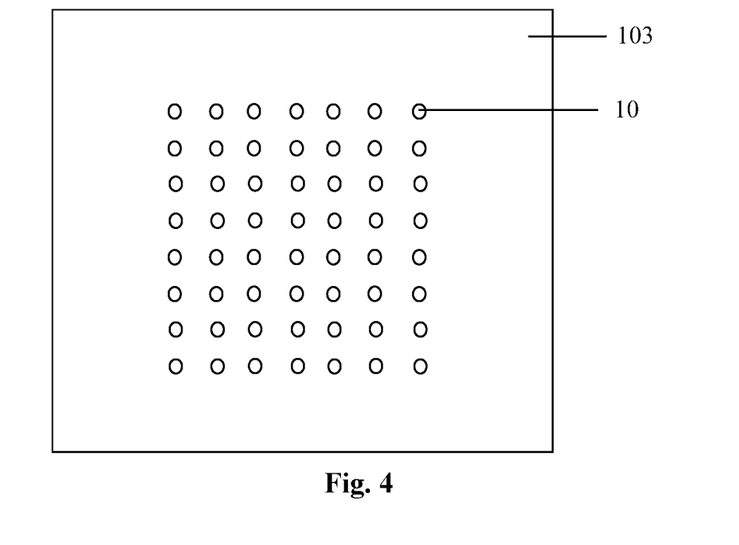
FIGS. 4-14 are schematic views showing the manufacture of the pressure sensor according to one embodiment of the present disclosure.

Step S2: as shown in FIG. 4, a metal material of platinum (Pt) or Ag may be evaporated in each first groove, so as to form a first metal nanotube, i.e., the first protrusion 10.

Figure 5:
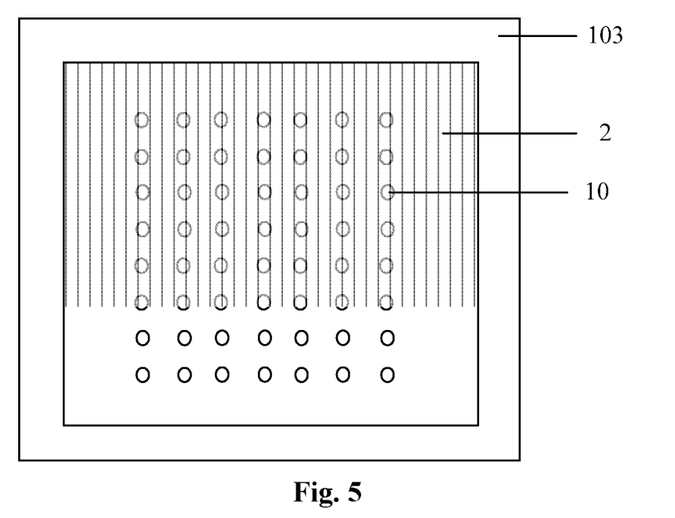
Figure 6:
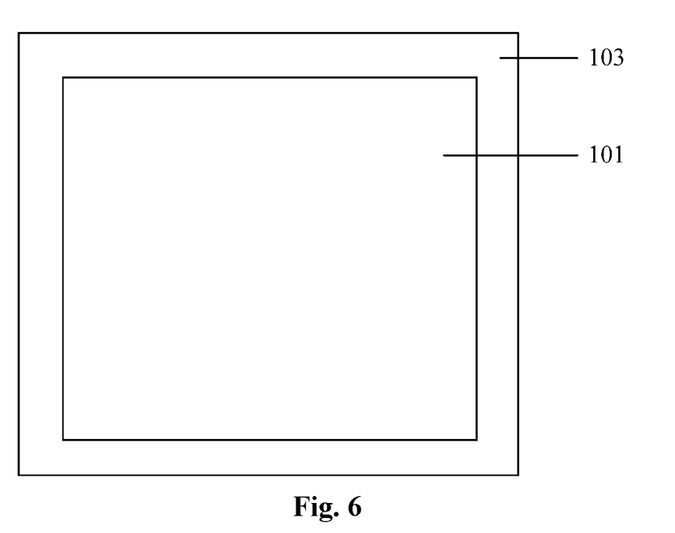
Figure 7:
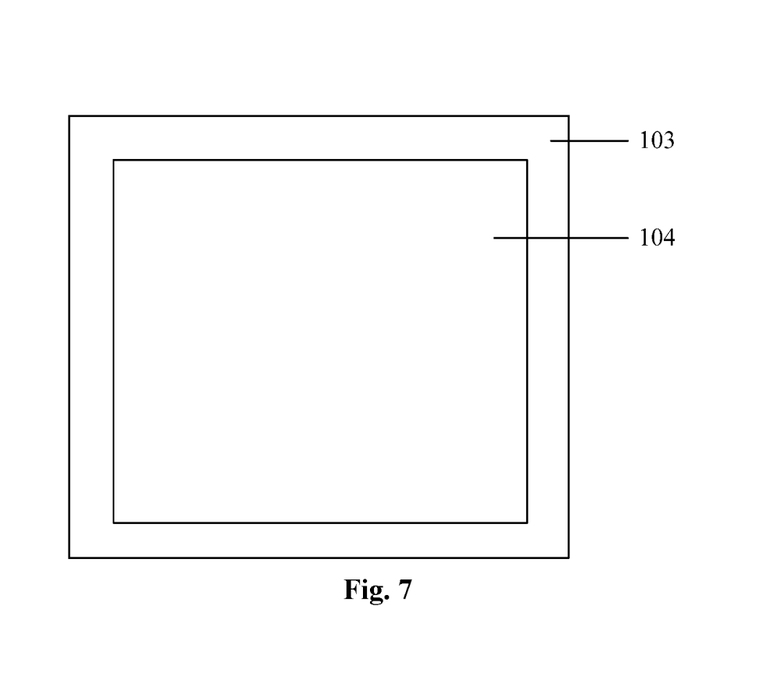

Step S3: the elastic restoration layer 2 (as shown in FIG. 5) and the flexible support layer (i.e., the flexible substrate 101 as shown in FIG. 6) may be sequentially formed on a surface of the first transitional substrate 103 with the first metal nanotubes 10, and then a fourth transitional substrate 104, e.g., a plastic substrate, may be coated with pressure onto the first transitional substrate 103, as shown in FIG. 7.

To be specific, a precursor of polyurethane acrylate (PUA) and polydimethylsiloxane (PDMS) may be applied sequentially onto the surface of the first transitional substrate 103 with the first metal nanotubes 10, and then the fourth transitional substrate 104 may be coated with pressure onto the first transitional substrate 103. The flexible support layer 103 may be made of PDMS.

Figure 8:
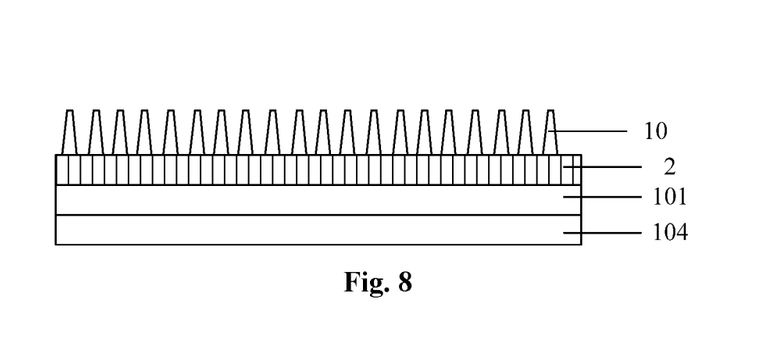

Step S4: the elastic restoration layer 2 may be formed through curing the precursor of PUA, and then the first transitional substrate 103 may be removed, as shown in FIG. 8.

At this time, the first substrate has been manufactured. The first substrate consists of the fourth transitional substrate 104, the flexible substrate 101, the elastic restoration layer 2 on the flexible substrate 101 and the first protrusions 10 on the elastic restoration layer 2. The first conductive structure of the resistor layer consists of a plurality of first protrusions 10. The fourth transitional substrate 104 serves as a support, so as to facilitate the subsequent manufacture process.

Figure 9:
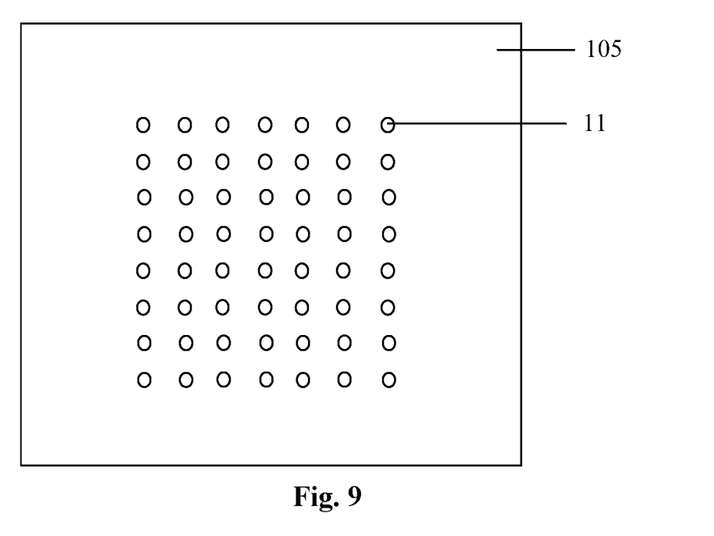

Step S5: as shown in FIG. 9, a plurality of second grooves each having a nanoscale diameter may be formed in a second transitional substrate 105, and a metal material of Pt or Ag may be evaporated in each second groove, so as to form the second metallic nanotubes, i.e., the second protrusions 11.

Figure 10:
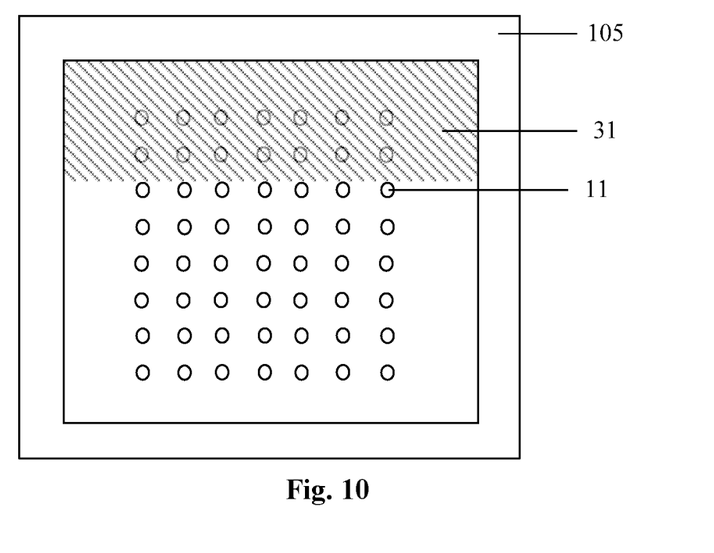
Figure 11:
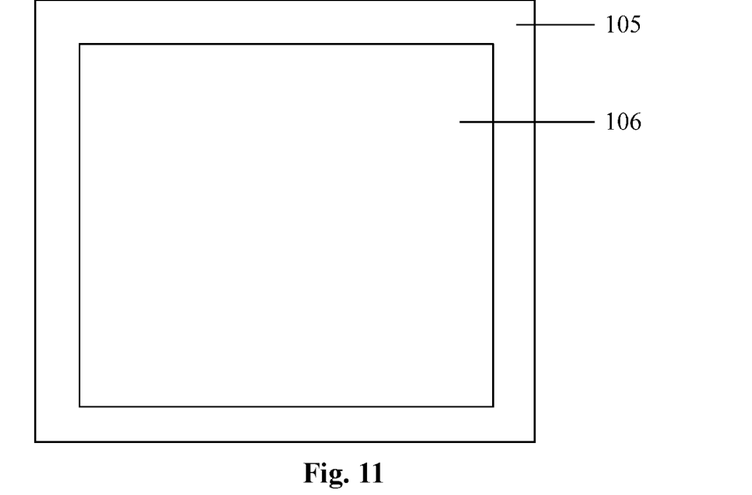

Step S6: the second electrode 31 of the OLED may be formed at a surface of the second transitional substrate 105 on which the second metallic nanotubes 11 has been formed, as shown in FIG. 10, and then a third transitional substrate 106, e.g., a plastic substrate, is coated with pressure onto the second electrode 31, as shown in FIG. 11.

The second electrode 31 may be made of an electrically conductive polymer, e.g., poly (3,4-ethylenedioxythiophene) (PEDOT):polystyrene sulfonate (PSS), so as to be adapted to the flexible pressure sensor in a better manner. The PEDOT:PSS is consisted of the PEDOT and the PSS. The PEDOT is a polymer of 3,4-ethylenedioxythiophene (EDOT). When the PEDOT and the PSS are mixed together, it is able to significantly improve the solubility of the PEDOT. An aqueous solution of the electrically conductive substance is mainly used for OLED, organic solar cell, organic thin film transistor, or the like.

Figure 12:
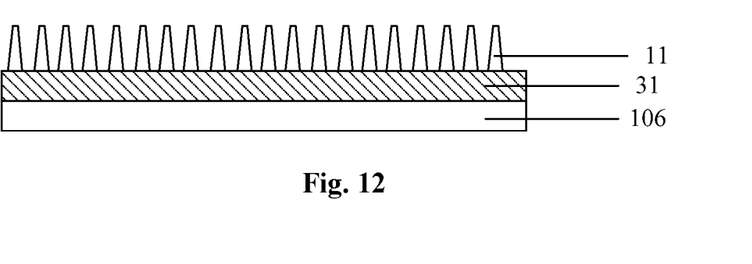

Step S7: the second transitional substrate 105 may be removed, as shown in FIGS. 11 and 12.

At this time, the second substrate has been manufactured. The second substrate consists of the third transitional substrate 106, the second electrode 31 on the third transitional substrate 106, and the second protrusions 11 on the second electrode 31. The second conductive structure of the resistor layer consists of the plurality of second protrusions 11. The first substrate and the second substrate may be manufactured in a reverse order, which will not be particularly defined herein.

Figure 13:
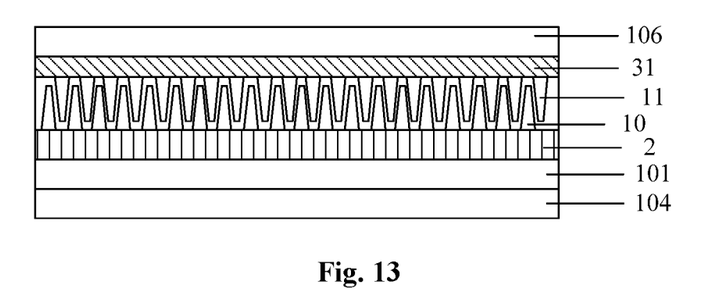
Figure 14:
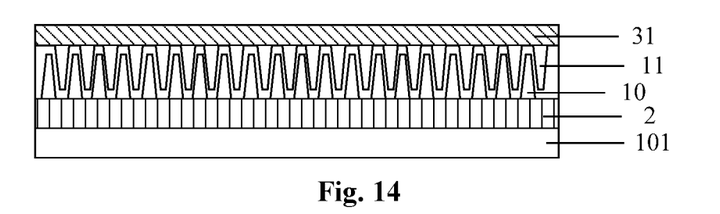

Step S7: the first substrate and the second substrate may be aligned and fixed to form a cell, as shown in FIG. 13, and then the fourth transitional substrate 104 and the third transitional substrate 106 may be removed, as shown in FIG. 14.

Step S8: as shown in FIG. 1, the organic light-emitting layer 32 and the first electrode 30 of the OLED 3 may be formed sequentially on the surface of the second electrode 31 distal to the elastic restoration layer 2.

Step S9: as shown in FIG. 1, the photoelectric sensor 4 may be formed on a surface of the first electrode 30 distal to the organic light-emitting layer 32.

The pressure sensor has been manufactured through the above steps. The pressure sensor may be manufactured, but not limited to, through the steps in the above order.

For the pressure sensor acquired through the above steps, the first electrode of the OLED and the resistor layer (including the first metallic nanotubes and the second metallic nanotubes) are connected to the two electrodes of the power source respectively, so as to form a loop. The sensitivity of the pressure sensor may be calculated using the following equation: $S=(I_1-I_0)/P$, where $I_0$ and $I_1$ represent currents flowing in the loop before and after the pressure is applied to the pressure sensor respectively, and P represents the pressure. To be specific, the pressure is applied to the pressure sensor from the back surface of the flexible substrate distal to the elastic restoration layer.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pressure sensor, comprising:
   an electroluminescent device, comprising a first electrode, a second electrode and an electroluminescent layer arranged between the first electrode and the second electrode;
   a resistor layer arranged at a side of the second electrode distal to the electroluminescent layer, and configured to be deformed in a such manner as to change a resistance of the resistor layer when a pressure is applied to the resistor layer, wherein the first electrode and the resistor layer are connected to two electrodes of a power source respectively to form a loop;

at least one photoelectric sensor configured to acquire a parameter related to a brightness change of the electroluminescent device;
a detection unit connected to the photoelectric sensor and configured to determine a size of the pressure in accordance with the parameter related to the brightness change of the electroluminescent device; and
an elastic restoration layer arranged at a side of the resistor layer distal to the first electrode or arranged at another side of the resistor layer proximate to the first electrode,
wherein the elastic restoration layer is made of an elastic material, and configured to be restored from deformation when the pressure applied to the resistor layer is removed, to restore the deformed resistor layer to its initial state.

2. The pressure sensor according to claim 1, further comprising a support layer,
wherein the resistor layer comprises a first conductive structure arranged on the elastic restoration layer, and a second conductive structure arranged on the support layer; and
the first conductive structure and the second conductive structure are arranged between the support layer and the elastic restoration layer, wherein when the resistor layer is deformed due to the pressure, a contact area between the first conductive structure and the second conductive structure changes, to change the resistance of the resistor layer.

3. The pressure sensor according to claim 2, further comprising a flexible substrate,
wherein the first conductive structure comprises a plurality of first protrusions arranged on a first surface of the elastic restoration layer distal to the flexible substrate;
the second conductive structure comprises a plurality of second protrusions, wherein the plurality of second protrusions is arranged on a second surface of the second electrode proximate to the flexible substrate, and the second surface is opposite to the first surface; or the plurality of second protrusions is arranged on a third surface of the support layer proximate to the flexible substrate, and the third surface is opposite to the first surface; and
the plurality of first protrusions and the plurality of second protrusions are arranged in a staggered manner, and when the resistor layer is deformed due to the pressure, a contact area between the first protrusion and the corresponding second protrusion increases, to reduce the resistance of the resistor layer.

4. The pressure sensor according to claim 3, wherein
the support layer is formed integrally with the second electrode, and the second electrode is made of an electrically conductive polymer; and
the first protrusions and the second protrusions are each a metallic nanorod or a carbon nanotube, and the metallic nanorod is a vertical nanorod made of platinum or silver.

5. The pressure sensor according to claim 3, wherein the resistor layer further comprises:
a first semiconductive film covering a portion of the elastic restoration layer between adjacent ones of the first protrusions; and
a second semiconductive film covering a portion of the second electrode between adjacent ones of the second protrusions or a portion of the support layer between adjacent ones of the second protrusions.

6. The pressure sensor according to claim 5, wherein the first semiconductive film and the second semiconductive film are each made of graphene.

7. The pressure sensor according to claim 3, wherein the elastic restoration layer is arranged on the flexible substrate, and the resistor layer is arranged at a surface of the elastic restoration layer distal to the flexible substrate.

8. The pressure sensor according to claim 7, wherein an orthogonal projection of each of the first protrusions onto the flexible substrate is spaced apart from or incompletely overlaps an orthogonal projection of a respective one of the second protrusions onto the flexible substrate, and the respective second protrusion is adjacent to the first protrusion.

9. The pressure sensor according to claim 1, wherein the resistor layer comprises: a first conductive structure arranged on the elastic restoration layer, and a second conductive structure arranged on the second electrode; and
the first conductive structure and the second conductive structure are arranged between the second electrode and the elastic restoration layer, wherein when the resistor layer is deformed due to the pressure, a contact area between the first conductive structure and the second conductive structure changes, to change the resistance of the resistor layer.

10. A method for manufacturing the pressure sensor according to claim 1, comprising:
forming the electroluminescent device, comprising forming the first electrode, the second electrode, and the electroluminescent layer between the first electrode and the second electrode;
forming the resistor layer, the first electrode and the resistor layer being connected to two electrodes of a power source respectively to form a loop;
forming the photoelectric sensor, the photoelectric sensor being configured to acquire a parameter related to a brightness change of the electroluminescent device; and
providing the detection unit, the detection unit being connected to the photoelectric sensor and configured to determine a size of the pressure in accordance with the parameter related to the brightness change of the electroluminescent device.

11. The method according to claim 10, further comprises:
forming an elastic restoration layer at a side of the resistor layer distal to the first electrode or at another side of the resistor layer proximate to the first electrode,
wherein the elastic restoration layer is made of an elastic material, and the elastic restoration layer is restored from deformation when the pressure applied to the resistor layer is removed, to restore the deformed resistor layer to its initial state.

12. The method according to claim 11, further comprising:
providing a support layer,
wherein the forming the resistor layer comprises: forming a first conductive structure on the elastic restoration layer, and forming a second conductive layer on the support layer, wherein the first conductive structure and the second conductive structure are arranged between the support layer and the elastic restoration layer, and when the resistor layer is deformed due to the pressure, a contact area between the first conductive structure and the second conductive structure changes, to change the resistance of the resistor layer.

13. The method according to claim 12, wherein
the forming the first conductive structure comprises: forming a plurality of first protrusions; and
the forming the second conductive structure comprises: forming a plurality of second protrusions,
wherein each of the first protrusions is arranged at a respective position corresponding to a region between the second protrusions, each of the second protrusions is arranged at a respective position corresponding to a region between the first protrusions, and when the resistor layer is deformed due to the pressure, a position of the first protrusion relative to a position of the second protrusion adjacent to the first protrusion changes, and thereby a contact area between the first protrusion and the second protrusion adjacent to the first protrusion increases, to reduce the resistance of the resistor layer.

14. The method according to claim 13, wherein
the forming the second conductive structure on the support layer comprises forming the second conductive structure on the second electrode, and the support layer is formed integrally with the second electrode.

15. The method according to claim 14, comprising:
forming a plurality of first grooves in a first transitional substrate;
filling the first grooves with a conductive material to form the first protrusions;
forming a film made of an elastic material onto a surface of the first transitional substrate on which the first protrusions have been formed, to form the elastic restoration layer;
forming a flexible substrate on a surface of the elastic restoration layer distal to the first transitional substrate;
removing the first transitional substrate, to form a first substrate comprising the flexible substrate, the elastic restoration layer on the flexible substrate and the first protrusions on the elastic restoration layer;
forming a plurality of second grooves in a second transitional substrate;
filling the second grooves with the conductive material to form the second protrusions;
forming the second electrode on a surface of the second transitional substrate on which the second protrusions have been formed;
coating the second electrode with a third transitional substrate;
removing the second transitional substrate, to form a second substrate comprising the third transitional substrate, the second electrode on the third transitional substrate, and the second protrusions on the second electrode; and
aligning and fixing the first substrate and the second substrate, and removing the third transitional substrate.

16. The method according to claim 15, wherein prior to aligning and fixing the first substrate and the second substrate, the method further comprises:
forming a first semiconductive film covering a portion of the elastic restoration layer between adjacent ones of the first protrusions; and
forming a second semiconductive film covering a portion of the second electrode between adjacent ones of the second protrusions or a portion of the support layer between adjacent ones of the second protrusions.

17. The method according to claim 11, wherein
the forming the resistor layer comprises: forming a first conductive structure on the elastic restoration layer, and forming a second conductive structure on the second electrode,
wherein the first conductive structure and the second conductive structure are arranged between a support layer and the elastic restoration layer, and when the resistor layer is deformed due to the pressure, a contact area between the first conductive structure and the second conductive structure changes, to change the resistance of the resistor layer.

18. An electronic device, comprising the pressure sensor according to claim 1.

19. A pressure sensor, comprising:
an electroluminescent device, comprising a first electrode, a second electrode and an electroluminescent layer arranged between the first electrode and the second electrode;
a resistor layer arranged at a side of the second electrode distal to the electroluminescent layer, and configured to be deformed in a such manner as to change a resistance of the resistor layer when a pressure is applied to the resistor layer, wherein the first electrode and the resistor layer are connected to two electrodes of a power source respectively to form a loop;
at least one photoelectric sensor configured to acquire a parameter related to a brightness change of the electroluminescent device; and
a detection unit connected to the photoelectric sensor and configured to determine a size of the pressure in accordance with the parameter related to the brightness change of the electroluminescent device, wherein
the photoelectric sensor is arranged at a surface of the first electrode distal to the electroluminescent layer.

20. A method for manufacturing a pressure sensor comprising an electroluminescent device, comprising a first electrode, a second electrode and an electroluminescent layer arranged between the first electrode and the second electrode;
a resistor layer arranged at a side of the second electrode distal to the electroluminescent layer, and configured to be deformed in a such manner as to change a resistance of the resistor layer when a pressure is applied to the resistor layer, wherein the first electrode and the resistor layer are connected to two electrodes of a power source respectively to form a loop;
at least one photoelectric sensor configured to acquire a parameter related to a brightness change of the electroluminescent device; and
a detection unit connected to the photoelectric sensor and configured to determine a size of the pressure in accordance with the parameter related to the brightness change of the electroluminescent device,
the method comprising:
forming the electroluminescent device, comprising forming the first electrode, the second electrode, and the electroluminescent layer between the first electrode and the second electrode;
forming the resistor layer, the first electrode and the resistor layer being connected to two electrodes of a power source respectively to form a loop;
forming the photoelectric sensor, the photoelectric sensor being configured to acquire a parameter related to a brightness change of the electroluminescent device;
providing the detection unit, the detection unit being connected to the photoelectric sensor and configured to determine a size of the pressure in accordance with the parameter related to the brightness change of the electroluminescent device; and forming an elastic restoration layer at a side of the resistor layer distal to the first electrode or at another side of the resistor layer proximate to the first electrode, wherein the elastic restoration layer is made of an elastic material, and the elastic restoration layer is restored from deformation when the pressure applied to the resistor layer is removed, to restore the deformed resistor layer to its initial state.

* * * * *